March 30, 1965  R. J. BERNARD  3,175,516
CONVEYOR APPARATUS
Filed May 14, 1963  6 Sheets-Sheet 6
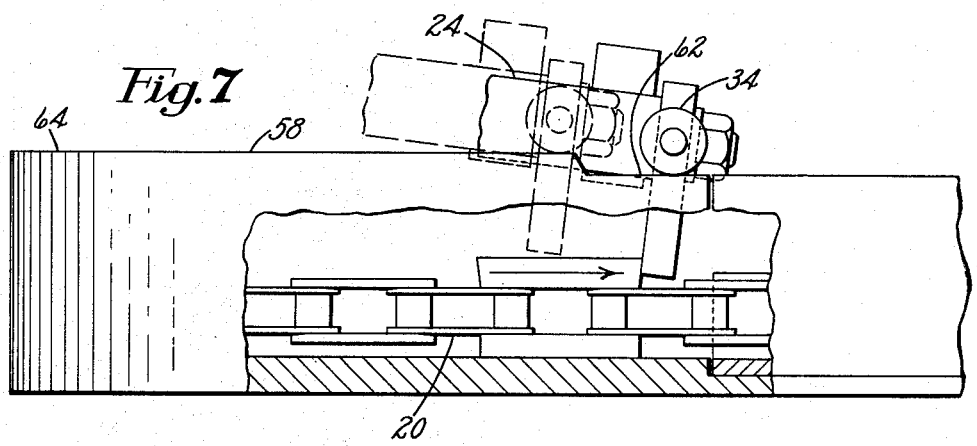
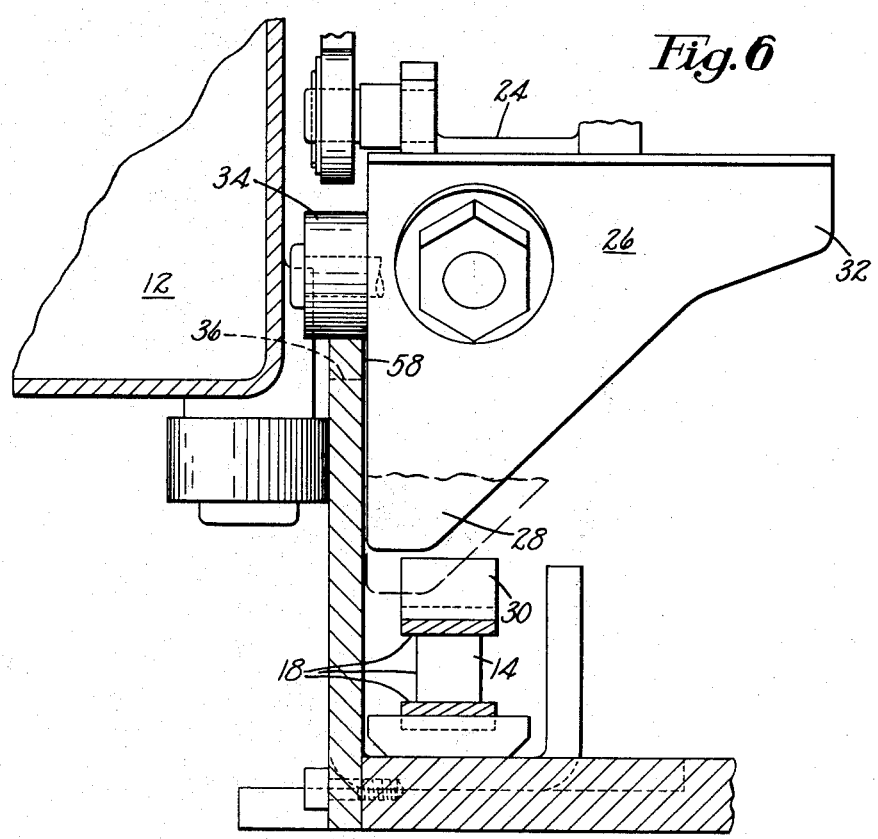

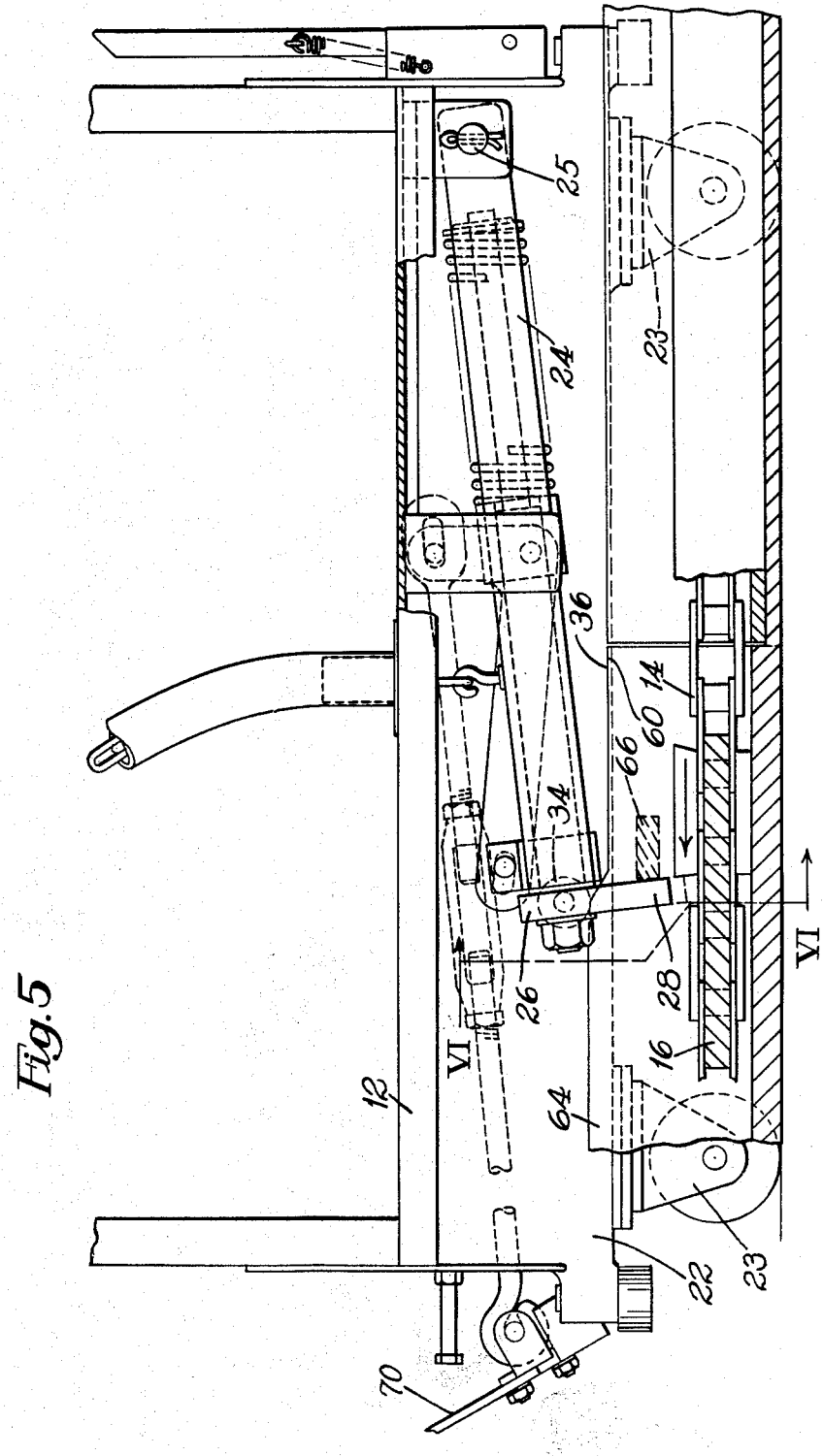

United States Patent Office 3,175,516
Patented Mar. 30, 1965

3,175,516
CONVEYOR APPARATUS
Robert J. Bernard, Peabody, Mass., assignor to United Shoe Machinery Corporation, Boston, Mass., a corporation of New Jersey
Filed May 14, 1963, Ser. No. 280,237
2 Claims. (Cl. 104—172)

This invention relates generally to conveyors, and has particular reference to a conveyor designed for use in the manufacture of shoes, and to means for controlling the operation thereof.

In United States Letters Patent No. 3,130,685, granted April 28, 1964 in the name of Sidney G. Goodrich et al., there is disclosed a conveyor system comprising a floor-mounted tow chain which is adapted to tow shoe racks from a pool position to various work stations. Means is also provided on the conveyor for releasing racks individually from the pool position, and separate means is provided at each work station for arresting a rack released from the pool position. In another copending application Serial No. 221,552, filed September 5, 1962 by J. Robbins et al., there is disclosed a novel form of rack stop mechanism which is particularly adapted for use with a conveyor of the type disclosed in the above-identified application.

In another copending application Serial No. 231,810, filed October 19, 1962 by Sidney G. Goodrich, there is disclosed a novel form of towing arm for use with racks of the type described in the above-identified application.

As illustrated in the above-identified applications, the conveyor chain comprises two parallel runs which travel in opposite directions, and are spaced apart far enough to permit the installation of stop mechanisms between the runs. During operation, racks travel in one direction between work stations disposed on one side of the conveyor chain and travel in the opposite direction between work stations on the opposite side of the conveyor chain.

When a rack arrives at the end of the first run, it has heretofore been necessary manually to remove it from operative relation to the chain, push it around the end of the conveyor and re-engage it with the chain. Such procedure requires that either an extra operator be stationed at the end of the conveyor, or that an operator of the machine at the end of the first run be assigned to move the racks around to the other side of the conveyor.

The object of this invention is to provide a conveyor system of the type described in which transfer means is provided at an end of the conveyor for automatically disengaging a rack from the conveyor chain and transferring it around the end of the conveyor and causing it to become re-engaged with the chain.

A further object of the invention is to provide, in a conveyor system of the type described, means for transferring racks from the end of one run of the conveyor chain to the start of a second run of conveyor chain at a speed substantially slower than the speed of the conveyor chain.

A further object of the invention is to provide means responsive to the presence of a rack at the discharge side of the transfer means to prevent the entrance of a second rack into the transfer means.

In the drawing:

FIG. 5 is a view in side elevation of a portion of the mechanism of FIG. 2 and an associated rack in position to be moved around the end of the conveyor by the mechanism;

FIG. 6 is a view in section taken on line VI—VI of FIG. 5;

FIG. 7 is a view similar to FIG. 5 in which the rack has been taken around the end of the conveyor and brought into operative relation to the second run of the conveyor;

FIG. 8 is a view taken on line VIII—VIII of FIG. 3.

Figure 1:
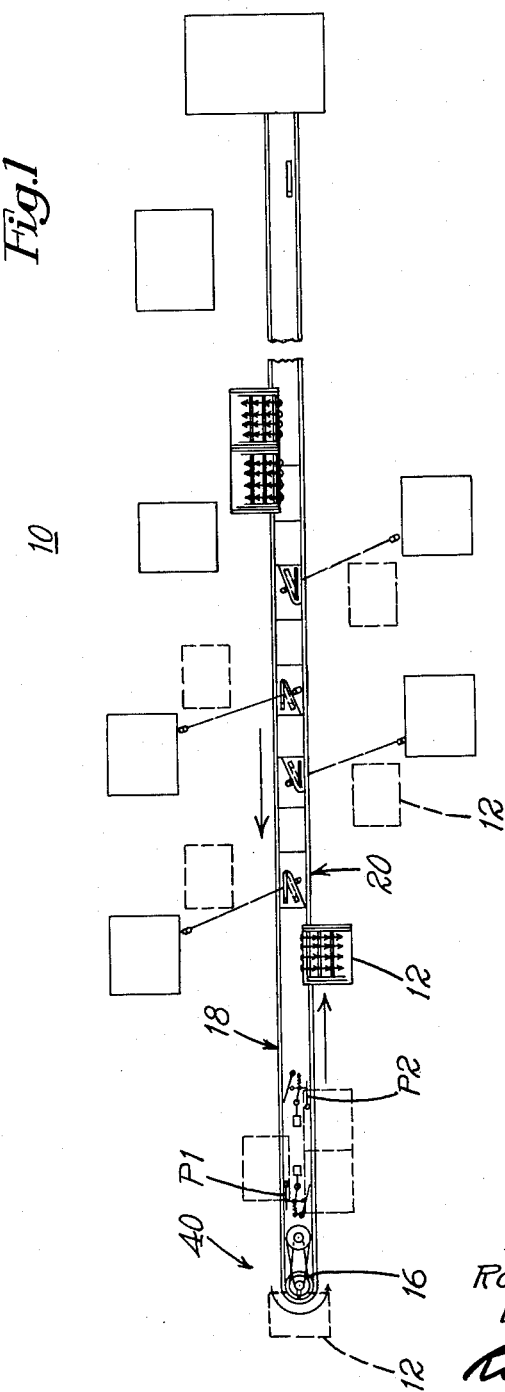
FIG. 1 is a schematic view of a conveyor system embodying the features of the invention.

Referring to the drawing, there is illustrated a conveyor system 10, of the type which is adapted to move article carrying devices such as shoe racks 12 or the like between work stations.

The conveyor comprises a continuous chain 14 driven by suitable means (not shown) at one end, said chain travelling around a suitable sprocket wheel 16 at the other end, forming two spaced runs 18 and 20 travelling in opposite directions. As described in the above-identified applications, various types of rack arresting mechanisms may be disposed between the runs.

The rack 12 for use with the conveyor system includes a base 22 supported by suitable casters, 23, and is adapted to be towed by the conveyor chain by means of a towing arm 24 which is pivoted to the base at 25 and extends forwardly therefrom, with a latch plate 26 disposed on the end thereof.

The plate 26 has a depending portion 28 for engagement with towing blocks 30 in the chain, and a laterally extending portion 32 for engagement with suitably positioned arresting mechanisms. To maintain the depending portion 28 in a predetermined heightwise relation to the chain, a roller 34 is provided on the towing arm for riding on the top of a towing arm support rail 36 disposed alongside the chain.

In the illustrated embodiment work stations are positioned along both sides of the conveyor runs, with the racks travelling between work stations in the direction indicated by the arrows (see FIG. 1). To provide means for automatically moving a rack around the end of the conveyor from outgoing run 18 to return run 20, a mechanism 40 now to be described is provided at the end opposite the driving mechanism.

The mechanism 40 is operated by the conveyor sprocket wheel 16 and comprises a second sprocket wheel 42 rotatably mounted on the shaft 44 and affixed to the conveyor sprocket wheel 16. A rack driving sprocket wheel 46 is also mounted on the shaft 44 and rotatable thereon independently of the rotation of the sprocket wheel 16, and a pair of speed reducing sprocket wheels 48 and 50 are mounted on a shaft 52 spaced from the shaft 44.

The sprocket wheel 16, driven by the conveyor chain, drives sprocket wheel 42 which in turn drives by means of a first drive chain 54 the upper sprocket wheel 50 on shaft 52. The lower sprocket wheel 48, driven by shaft 52 drives, through second drive chain 56, the rack driving sprocket wheel 46. The ratio of size of the sprocket wheels is such that the speed of rotation of the rack driving wheel 46 is about ⅕ of the speed of the rotation of the conveyor sprocket 16.

Disposed around the conveyor chain sprocket 16 is a guide rail 58 having portions 60 and 62 adjacent the ends of the towing arm support rails 36 which are the same height as said rails, and having a medial portion 64 which is higher than the portions 60 and 62 for a purpose to appear hereinafter.

To engage the latch plate of a rack and move the rack around the end of the conveyor the sprocket wheel 46 is provided with a tongue 66 which projects beyond the periphery of the conveyor sprocket 16 and is positioned heightwise so as to engage the latch plate 26 of a rack in a manner now to be described. As a rack 12 is conveyed by the chain 14 toward the mechanism 40, with the roller 34 of the towing arm riding on the support rail 36 and the depending portion 28 of the latch plate engaged by a towing block 30, the roller 34 passes over the end portion 60 of the guide rail 58 and up onto the medial portion 64. The latch plate is thereby lifted out of engagement with the towing block 30, and the rack stops with the roller 34 resting on the elevated medial portion, with the latch plate approximately in the position shown in FIGS. 2 and 5.

Figure 2:
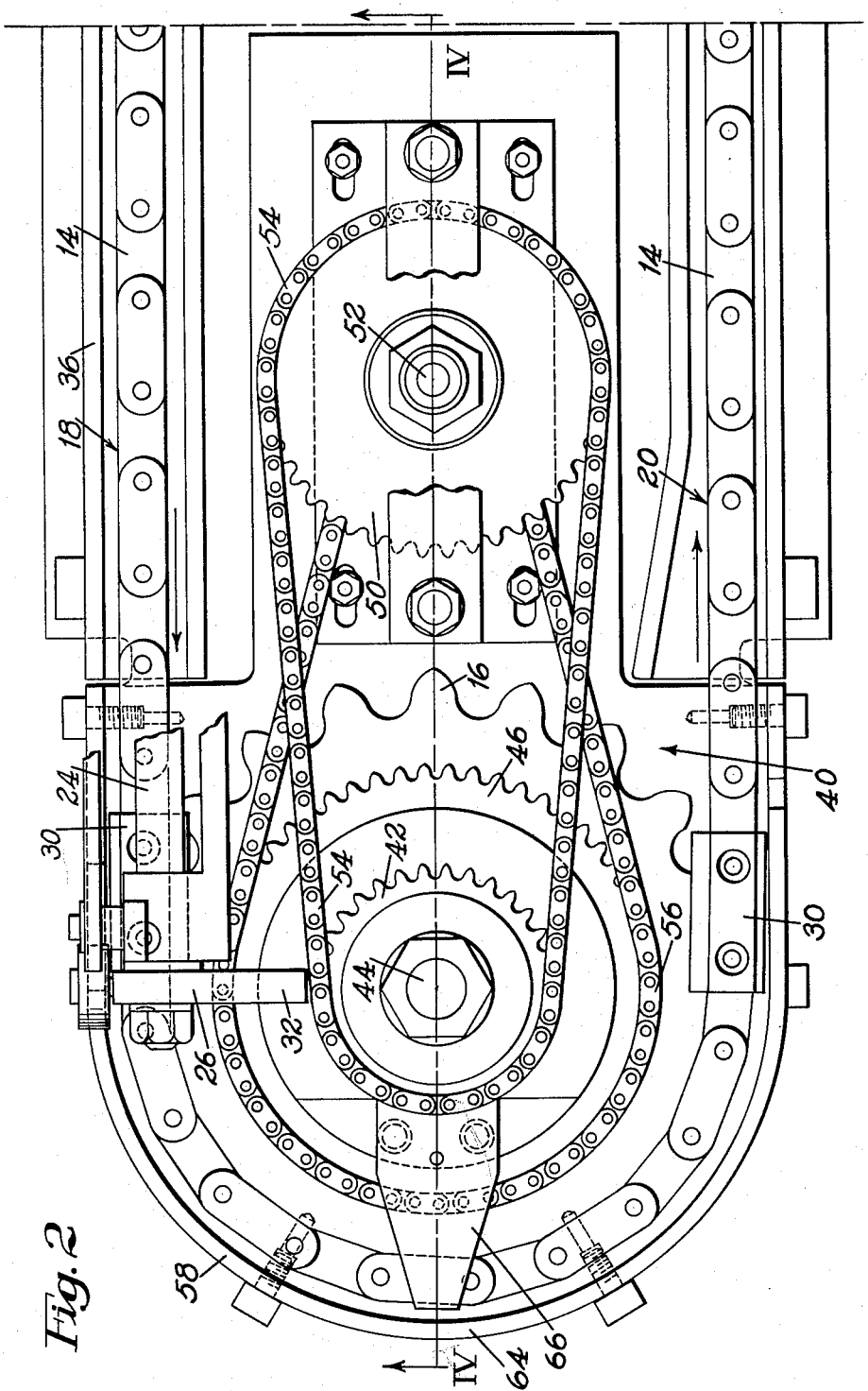
FIG. 2 is an enlarged view of one end of the conveyor of FIG. 1 illustrating the mechanism for moving a rack around the end of the conveyor.
Figure 3:
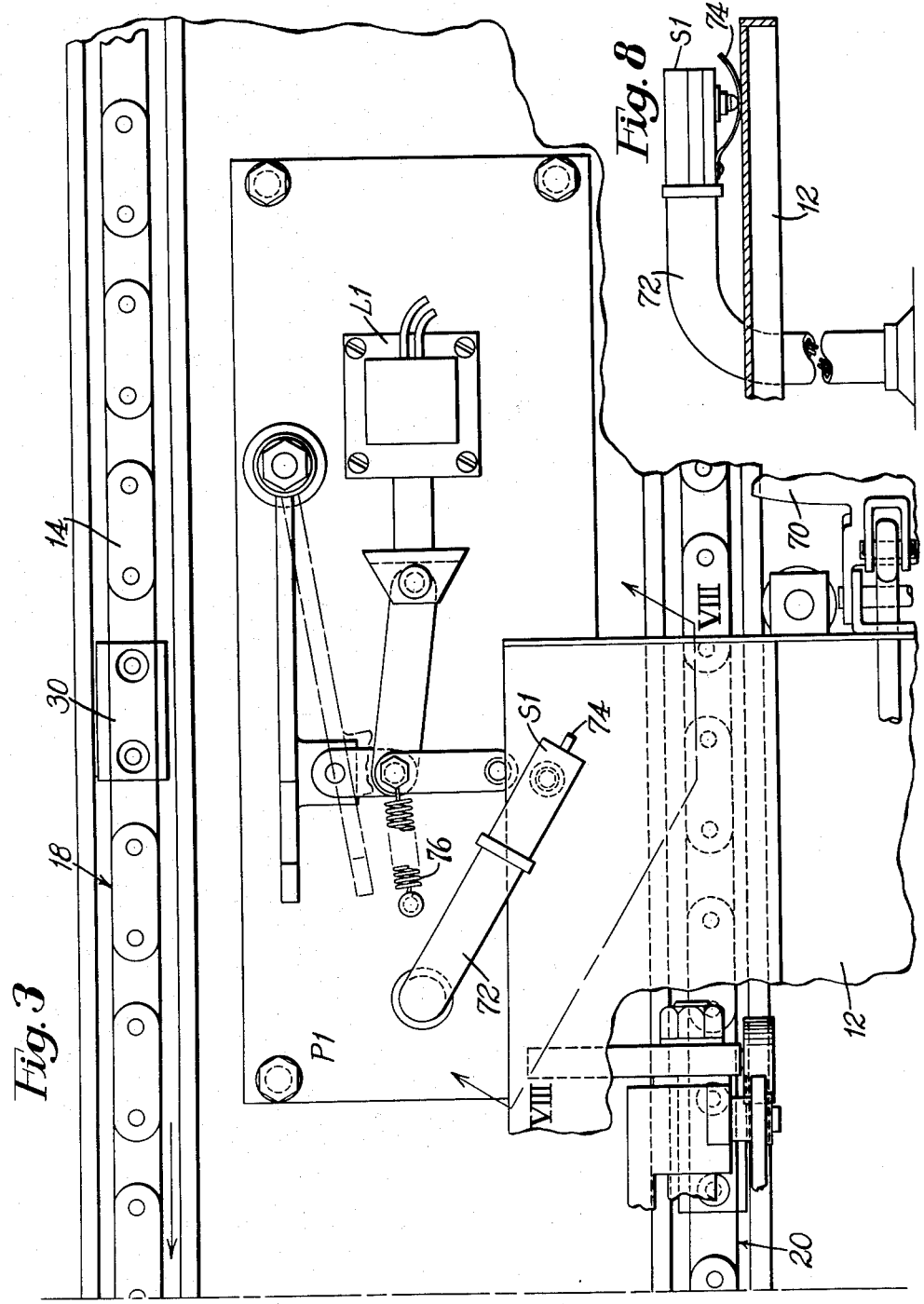
FIG. 3 is an extension of the right end of FIG. 2.
Figure 4:
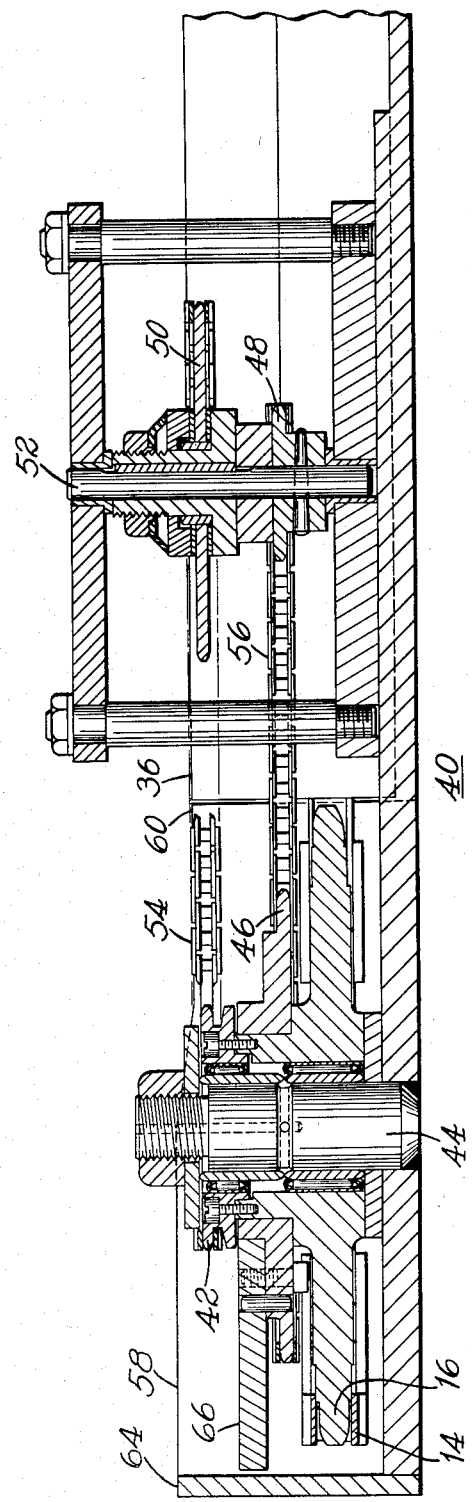
FIG. 4 is a view in section taken on line IV—IV of FIG. 2.

Thereafter, as the sprocket 46 rotates (counterclockwise as seen in FIG. 2), the tongue 66 engages the rear side of the latch plate (see FIG. 5) and thereby forces the rack to travel around the end of the conveyor with the rack being guided by the engagement of the latch plate with the guide rail 58. When the tongue 66 has rotated through just over 180°, the roller 34 passes from the medial position 64 down onto the end portion 62 of the guide rail (see FIG. 7) so that the latch plate is lowered into operative relation to the conveyor chain to be engaged by the next towing block 30, to be conveyed toward the next work station.

In the illustrated embodiment of the invention a pool stop P1 similar to the type described in the above-identified applications is provided at the end of the run 18 of the conveyor, and a second pool stop P2 is provided in run 20 near the first work station. The pool stop P1 is controlled by solenoid L1, which is normally energized to maintain P1 in the open position, and is normally open, so that racks travelling toward the mecahnism 40 from the last work station on run 18 are not normally stopped by the pool stop P1, but continue around the end of the conveyor to pool stop P2.

During normal operation, several racks may accumulate at the pool station P2, with the accumulated racks extending back as far as the mechanism 40. In such case, if an additional rack were to come around the transfer mechanism 40, damage to the rack or transfer mechanism may result for the following reason. As described in the above-identified applications, the racks are provided with bumper means 70 on the front end for causing disengagement of the towing arm from the conveyor chain on collision with a preceding rack. However, in the event that a rack enters the transfer mechanism when the accumulated racks at the pool stop P2 extend back to the transfer mechanism, the angle of contact between another rack travelling around the transfer mechanism and the last rack of the group at the pool stop P2 may be such that the bumper mechanism is not operated. To avoid such possibility means is provided at the discharge side of the transfer mechanism to detect the presence of a rack, and to prevent another rack from entering the transfer mechanism.

In the illustrated embodiment, said detecting means comprises a microswitch S1, which is mounted on an arm 72, and disposed in a position such that an operating lever 74 is contacted by a rack on the adjacent portion of conveyor run 20. When switch S1 is closed by the rack, solenoid L1 is de-energized to allow spring 76 to move stop member P1 to the stop position to prevent any racks from entering the transfer mechanism until the discharge side is clear.

Although in the illustrated embodiment the transfer mechanism is adapted to rotate the rack through 180° in transferring it from the first run to the second run, it will be apparent that, with obvious modifications, the transfer mechanism may be utilized to transfer racks between runs that are disposed at any desired orientation in relation to each other. For example, the features of the invention may be applied to a conveyor system in which the second run is disposed at a right angle to the first run.

Since certain other obvious changes may be made in the device without departing from the scope of the invention it is intended that all matter contained herein be interpreted in an illustrative but not a limiting sense.

Having thus described my invention, what I claim as new and desire to secure by Letters Patent of the United States is:

1. A transfer mechanism for use with a conveyor system of the type described, in which a tow chain for conveying article carrying devices having tow chain engaging elementas travels around a direction changing wheel dividing said tow chain into first and second runs, said mechanism comprising a guide rail disposed around the wheel, having an initial portion adapted to effect disengagement of the tow chain engaging element from the first run of the tow chain, rotatable means for thereafter engaging the tow chain engaging means to cause the article carrying device to travel around the guide rail into operative relation to the second run.

2. A transfer mechanism for use with a conveyor system of the type described, comprising a sprocket wheel receiving a tow chain and dividing the chain into first and second runs, a guide rail disposed around the portion of the sprocket engaged by the chain, said guide rail having ramp portions at the ends to cam chain engaging means of an article carrying device out of engagement with the chain at one end of the guide rail and lower it into engagement with the chain at the other end, and a rotatable member adapted to rotate inside the guide rail and engage the article carrying device and transfer it around the guide rail, and means rotating said rotatable member at a rate substantially less than that of the sprocket wheel.

References Cited in the file of this patent

UNITED STATES PATENTS

| | | |
|---|---|---|
| 369,335 | Goddu | Sept. 6, 1887 |
| 2,688,935 | Brooks | Sept. 14, 1954 |
| 2,688,936 | Brooks | Sept. 14, 1954 |
| 2,868,138 | Bishop et al. | Jan. 13, 1959 |
| 2,875,704 | Yates | Mar. 3, 1959 |
| 3,045,610 | Klamp | July 24, 1962 |
| 3,056,360 | Burmeister et al. | Oct. 2, 1962 |
| 3,076,418 | Orwin | Feb. 5, 1963 |
| 3,092,038 | Orwin | June 4, 1963 |